Figure 1:
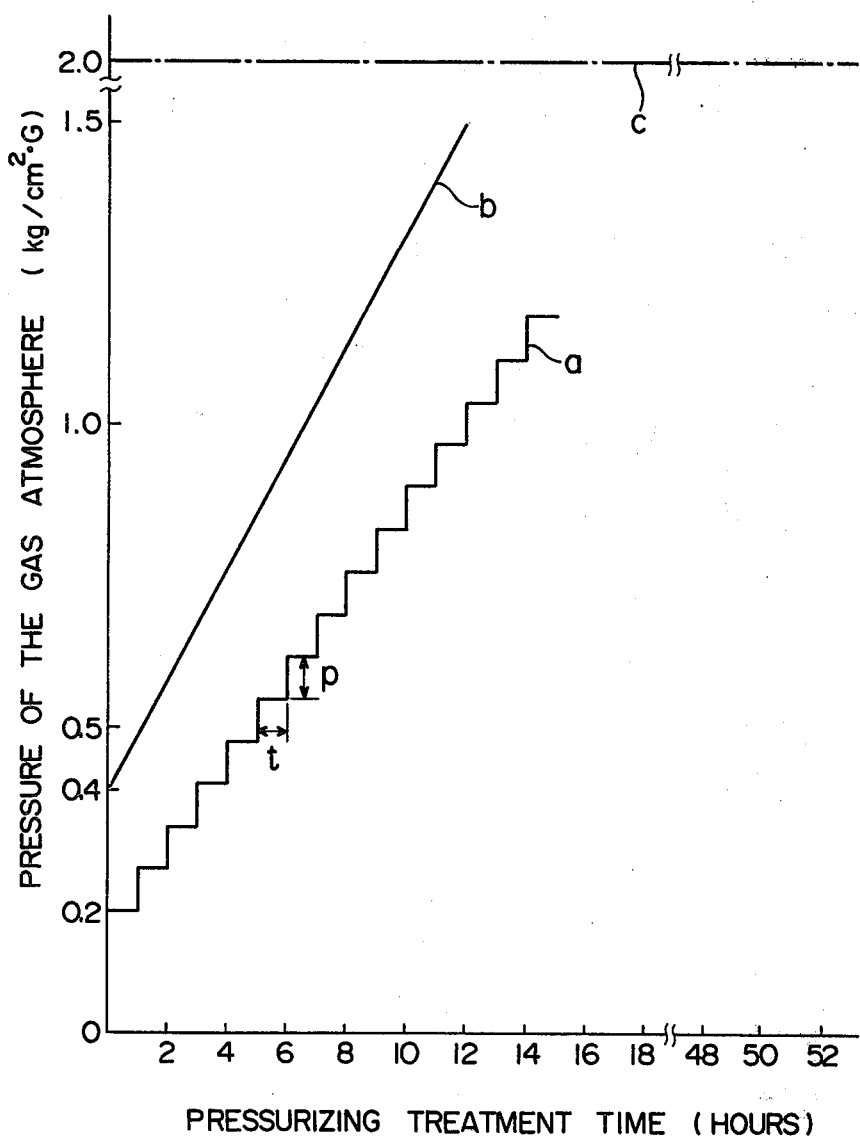

United States Patent [19]

Akiyama et al.

[11] 4,443,393

[45] Apr. 17, 1984

[54] METHOD OF PRESSURIZING TREATMENT OF PRE-FOAMED PARTICLES OF POLYOLEFIN RESIN

[75] Inventors: Hiroyuki Akiyama, Hiratsuka; Hideki Kuwabara, Hatano; Toru Yamaguchi, Tsukui; Masahiko Kishida, Hiratsuka, all of Japan

[73] Assignee: Japan Styrene Paper Corporation, Tokyo, Japan

[21] Appl. No.: 447,670

[22] Filed: Dec. 7, 1982

[30] Foreign Application Priority Data

Dec. 9, 1981 [JP] Japan .................................. 56-199115

[51] Int. Cl.³ .............................................. C08J 9/22
[52] U.S. Cl. ................................ 264/53; 264/DIG. 9; 264/DIG. 15; 521/58
[58] Field of Search .......... 264/DIG. 15, 53, DIG. 9; 521/58

[56] References Cited

U.S. PATENT DOCUMENTS

| | | | |
|---|---|---|---|
| 2,986,537 | 5/1961 | Chaurueton | 264/DIG. 15 |
| 2,998,396 | 8/1961 | Nickolls | 264/DIG. 15 |
| 3,013,996 | 12/1961 | Pollard et al. | 264/DIG. 15 |
| 3,126,432 | 3/1964 | Schuur | 264/DIG. 15 |
| 3,631,133 | 12/1971 | Balligelli | 264/DIG. 15 |
| 3,725,320 | 4/1973 | Wang | 264/DIG. 15 |
| 4,150,077 | 4/1979 | Slocumb | 264/DIG. 15 |
| 4,366,263 | 12/1982 | Sato et al. | 264/DIG. 15 |

Primary Examiner—Morton Foelak
Attorney, Agent, or Firm—Sherman & Shalloway

[57] ABSTRACT

A method for pressurizing pre-foamed particles of a polyolefin resin by maintaining the pre-foamed particles in an atmosphere of a pressurized gas to impart a predetermined internal pressure thereto, which comprises first maintaining the particles under a pressure which does not cause shrinkage to the particles, and then increasing the applied pressure gradually under conditions which do not cause shrinkage to the particles.

2 Claims, 2 Drawing Figures

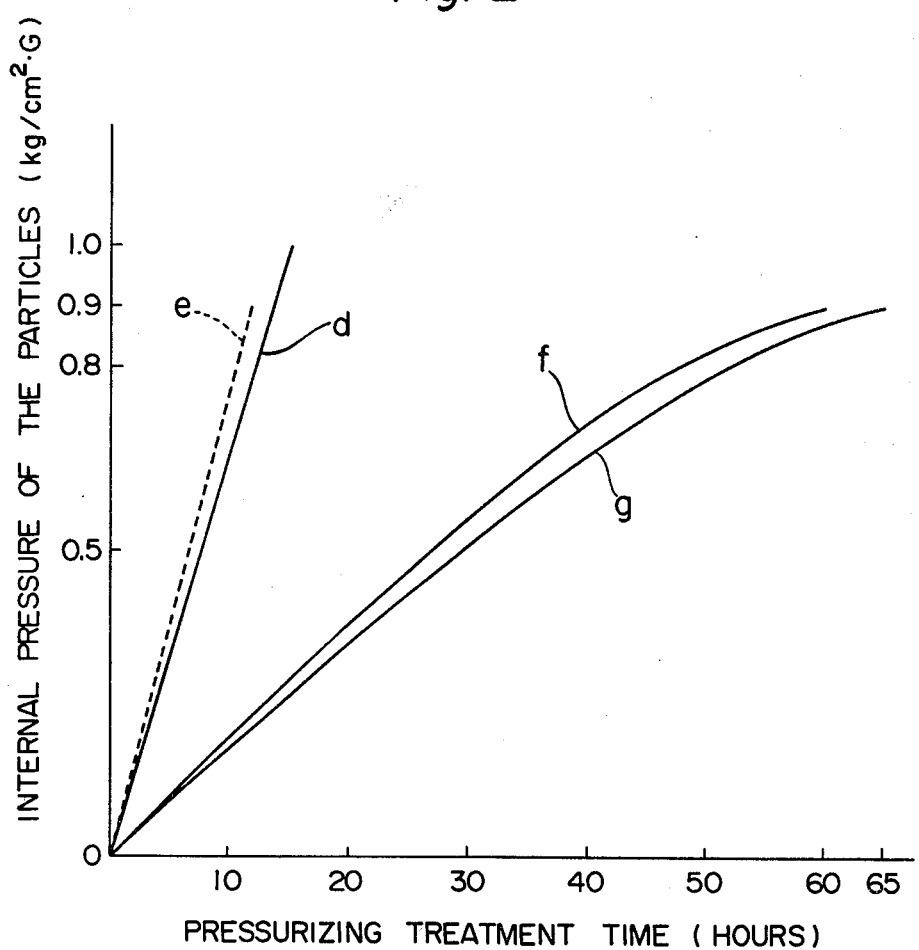

METHOD OF PRESSURIZING TREATMENT OF PRE-FOAMED PARTICLES OF POLYOLEFIN RESIN

It is generally known that in molding pre-foamed particles of a polyolefin resin in a mold, the pre-foamed particles are subjected to a pressurizing treatment prior to the moldig step in order to impart thereto an internal pressure suitable for molding. Usually, the pressurizing treatment is effected by placing the particles in a pressurizing vessel, and pressurizing the particles by introducing an inorganic gas such as air or nitrogen into the vessel thereby to force the inorganic gas into the particles and thus to impart a fixed gas pressure thereto.

According to a conventional method of pressurizing treatment, the pre-foamed particles are pressurized for a certain period of time in an atmosphere kept under a certain pressure. A two-step pressurizing method is also known which comprises first maintaining the pre-foamed particles in an atmosphere kept under a pressure of not more than 8 kg/cm$^2$(G) and then maintaining them in an atmosphere kept at a lower pressure than the aforesaid pressure which is selected from the range of 0.5 to 3 kg/cm$^2$(G) (Japanese Patent Publication No. 30304/1977).

The conventional methods, however, have the defect that since after the pre-foamed particles are placed in a pressurized vessel, they are pressurized abruptly and maintained at a certain high pressure, the particles are markedly shrunken under the influence of the high pressure and consequently various troubles occur as mentioned below. Upon shrinkage, the particles decrease in volume and the internal pressure of the particles increases. Hence, the difference between the internal pressure and the pressure of the gaseous atmosphere is initially small, and the pressurized gas cannot be easily forced into the particles. As a result, when the pressurized atmosphere is removed and the particles regain their original volume, the internal pressure of the particles becomes low. Furthermore, when the particles are shrunken, they fill the pressurized vessel as a dense mass substantially free from spaces among the particles. For this reason, too, the pressurized gas is difficult to force into the particles. At this time, the particles present in the interior of the mass filled in the pressurizing vessel are more difficult of permeation of the pressurized gas than those particles which are present in the outer circumferential part of the filled mass (because in the interior of the mass, the adjacent particles contact intimately at their circumferential surfaces and few spaces exist among them). This brings about the disadvantage that the particles obtained have varying internal pressures.

Thus, in the conventional methods, the reduction of the internal pressure of the particles cannot be avoided. Molding of pre-foamed particles having a low internal pressure cannot give a foamed article having good quality. The resulting molded article has shrinkage and sinks, or the melt-adhesion of the particles is poor. According to the conventional methods, it is necessary therefore to supply a gaseous atmosphere kept at an excessively high pressure or to prolong the time of pressurizing treatment so that an internal particle pressure required for good molding may be obtained. Such means, however, are disadvantageous for industrial application because the former requires the use of a special pressurizing vessel which withstands high pressures, and the latter has the defect of causing a reduction in production efficiency.

Generally, a reduction in the internal pressure of particles occurs while after the pressurizing treatment, the particles are left to stand until they are offered for molding. With the conventional methods, the reduction in the internal pressure of the particles is remarkable. This is presumably because the particles are shrunken during the pressurizing treatment.

Even when the particles are shrunken during the pressurizing treatment, it is possible to return the particles gradually to their original shape (spherical shaped with the lapse of time while maintaining them in a pressurized atmosphere. This, however, requires a very long period of time and is unsuitable for industrial operations.

In addition to the aforesaid defects, the conventional methods also have the defect that the cellular walls undergo damage as a result of the shrinkage of the particles by the pressure of the pressurized gas, and this causes a reduction in the physical strength of the particles and the occurrence of creases or injuries in the particles.

The present invention has for its object the elimination of the aforesaid defects of the conventional methods, and provides a method for pressurizing pre-foamed particles of a polyolefin resin by maintaining the pre-foamed particles in an atmosphere of a pressurized gas to impart a predetermined internal pressure thereto which comprises first maintaining the particles under a pressure which does not cause shrinkage to the particles, and then increasing the applied pressure gradually under conditions which do not cause shrinage to the particles.

Examples of the polyolefin resin which may be used in this invention are low-density polyethylene, high-density polyethylene, an ethylene/vinyl acetate copolymer, polypropylene and an ethylene/propylene copolymer. The polyethylene resins are especially beneficial. The polyolefin resins may be crosslinked or non-crosslinked.

The pre-foamed particles used in this invention may be obtained by any method. They may be, for example, prefoamed particles obtained by dispersing resin particles containing a volatile blowing agent in a dispersing medium within a closed vessel, heating the dispersion, and releasing the resin particles and the dispersing medium into an atmosphere kept at a lower pressure than the pressure of the inside of the vessel thereby to foam the resin particles, and pre-foamed particles obtained by placing resin particles containing a volatile blowing agent in an open vessel, and heating them in the vessel to foam the resin particles.

The pre-foamed particles obtained by a pre-foaming step may, or may not, be aged at room temperature before the pressurizing treatment in accordance with the method of this invention. Aging at room temperature is a step of allowing the pre-foamed particles at room temperature and atmospheric pressure to replace the volatile blowing agent in the particles by an inorganic gas such as air. The aging step may be employed, as required, according to the properties of the resin used.

According to the method of this invention, the pre-foamed particles are maintained in an atmosphere of a pressurized gas by placing the particles in a pressurizing vessel, and feeding an inorganic gas or a mixture of an inorganic gas and a volatile blowing agent into the vessel to pressurize them. In performing this pressurization in accordance with this invention, the particles are first maintained under a pressure which does not cause shrinkage to the particles, and then the applied pressure is gradually increased under conditions which do not cause shrinkage to the particles. The pressure initially applied is a pressure which does not cause shrinkage to the particles. The initial pressure to be applied differs according to the material or expansion ratio of the particles, the temperature of the pressurizing treatment, etc. For example, in the case of cross-linked foamed particles of polyethylene having an expansion ratio of 15, the suitable initial pressure is not more than 0.5 kg/cm$^2$(G), preferably not more than 0.4 kg/cm$^2$(G).

Then, the applied pressure is increased gradually under conditions which do not cause shrinkage to the particles. If the pressure is abruptly increased, the particles will undesirably be shrunken. If, on the other hand, the raising of the pressure is too slow, the application of a predetermined internal pressure becomes time-consuming, and the production efficiency decreases. It is necessary therefore to determine a suitable rate of pressure elevation. The rate of pressure elevation differs depending upon the material of the particles, the temperature of pressurizing treatment, etc. For example, the suitable rate of pressure elevation is not more than 0.2 kg/cm$^2$/hr, preferably 0.03 to 0.2 kg/cm$^2$/hr.

The pressure may be elevated stepwise or continuously. According to the former procedure, the particles are pressurized to a predetermined pressure and maintained under this pressure for a predetermined period of time; then the pressure is raised to a certain level and the particles are maintained under this raised pressure for a predetermined period of time. This procedure is repeated until the desired pressure is reached. The latter procedure increasing the pressure continuously without including a step of maintaining the particles under a predetermined pressure for a predetermined period of time. In performing the latter procedure, an automatic pressure elevating device may, for example, be used. The final pressure applied differs depending upon the material of the particles, the type of the inorganic gas or the gaseous mixture, etc. Usually, it is 0.7 to 3 kg/cm$^2$(G), preferably 0.9 to 2 kg/cm$^2$(G).

The temperature of the pressurizing treatment is usually room temperature, but it may be carried out at an elevated temperature. The temperature may be properly selected in relation to the material of the particles and the pressurizing time. The pressurizing time is usually 5 to 40 hours although it may be properly selected according to the rate of the pressure elevation, the kind of the inorganic gas or the gaseous mixture, the pressurizing temperature, etc. Examples of the inorganic gas used for the pressurizing treatment are air, nitrogen, argon, helium, neon, and carbon dioxide, and mixtures of at least two of these. Air is most economical and desirable. Illustrative of the volatile blowing agent are aliphatic hydrocarbons such as propane, butane, pentane, hexane and heptane, alicyclic hydrocarbons such as cyclobutane and cyclopentane, and halogenated hydrocarbons such as trichlorofluoromethane, dichlorodifluoromethane, dichlorotetrafluoroethane, methyl chloride, ethyl chloride and methylene chloride.

By the pressurizing treatment in accordance with this invention described hereinabove, the inorganic gas or its mixture with the volatile blowing agent is penetrated and forced into the pre-foamed particles to impart a predetermined gas pressure to the inside of the particles. The suitable internal pressure of the particles is 0.2 to 2.5 kg/cm$^2$(G), preferably 0.5 to 0.9 kg/cm$^2$(G).

Since in the conventional methods, the particles shrink during the pressurizing treatment, the removal of the pressurized atmosphere results in a tendency for the particles to expand beyond its volume under pressure, and the volume of the particles before removal of the pressurized atmosphere differs from that after its removal. Accordingly, the pre-foamed particles pressurized by the conventional methods undergo a marked reduction in internal pressure while they are left to stand before molding. In contrast, since the pressurizing treatment in accordance with this invention is carried out under conditions which do not cause shrinkage to the particles, the aforesaid phenomenon with the conventional techniques is not observed, and the reduction in the internal pressure of the particles during the standing time before molding is only slight. Hence, there is no likelihood of causing inconvenience such as the disappearance or reduction of the foaming ability of the particles.

The molding of the particles treated in accordance with this invention may be performed, for example, by filling the pressurized pre-foamed particles in a mold capable of enclosing the particles but allowing escape of gases therefrom and expanding them by heating thereby to melt-adhere the particles to each other and give a molded article conforming to the configuration of the mold.

Since according to this invention, the pre-foamed particles do not shrink during the pressurizing treatment, there is no likelihood that the difference between the internal pressure of the particles and the pressure of the gaseous atmosphere is small from the initial stage as in the conventional methods. Furthermore, when the particles are filled in a pressurizing vessel, suitable spaces form between the particles. For this reason, the pressurized gas is penetrated and forced into the interior of the particles in good condition. Because of the aforesaid suitable spaced formed in the filled state, there is scarcely any difference in the degree of penetration of the pressurized gas between those particles which exist on the outer circumferential portion of the particle mass and those which exist in its interior, and the internal pressure does not vary from particle to particle.

Thus, according to this invention, the pressurized gas can be penetrated and forced well into all of the particles, and it is not necessary to supply a gaseous atmosphere kept at an excessively high pressure as in the prior art. The present invention further has an effect of imparting the desired internal pressure within a short period of time. Consequently, expenditures that go into equipment such as high-pressure vessels can be reduced, and the pressurizing treatment can be carried out easily with a greatly increased efficiency. Hence, the present invention offers a great industrial and economical advantage.

Furthermore, the removal of the pressurized atmosphere after the pressurizing treatment does not result in a change in the volume of the particles, and the reduction of the internal pressure of the particles during the standing time before molding is only slight. Moreover, since the particles do not shrink during the pressurizing treatment, there can be obtained pre-foamed particles of good quality which is free from damages at the cellular walls and creases or injuries and having excellent physical strength and good appearance.

The following Examples and Comparative Examples together with the accompanying drawings illustrate the present invention more specifically.

In the drawings, FIG. 1 is a graph showing the relation between the pressurizing time and the pressure of the gaseous atmosphere, and FIG. 2 is a graph showing the relation between the pressurizing time and the internal pressure of the particles.

EXAMPLES 1 AND 2 AND COMPARATIVE EXAMPLES 1 AND 2

In each run, resin particles of each of the base resins shown in Table 1, water and dichlorodifluoromethane in the proportions shown in Table 1 were placed in a closed vessel, and with stirring heated to 100° to 150° C. and maintained for 0.5 hour. While the pressure of the inside of the vessel was maintained at about 30 kg/cm²(G), one end of the vessel was opened to release the resin particles and water simultaneously into the atmosphere, and dried to form pre-foamed particles. The expansion ratio of the pre-foamed particles is shown in Table 1.

TABLE 2

|  | Initial pressure (kg/cm²·G) | Pressure elevating rate (kg/cm²/hr) | Method of pressure elevation | Final pressure (kg/cm²·G) | Pressurizing time (hours) |
|---|---|---|---|---|---|
| Example 1 | 0.2 | 0.07 | Stepwise | .18 | 15 |
| Example 2 | 0.4 | 0.09 | Continuous | 1.5 | 12 |
| Comparative Example 1 | 2.0 | — | — | 2.0 | 48 |
| Comparative Example 2 | 2.0 | — | — | 2.0 | 52 |

The volume shrinkage of the particles, the internal pressure of the particles, the presence or absence of variations in the internal pressure, and the appearance of the particles after the pressurizing treatment, and the internal pressure of the particles after standing for 10 minutes in the open atmosphere upon removal of the pressurized atmosphere were determined, and the result are shown in Table 3.

TABLE 3

|  | Volume shrinkage of the particles (%) | Internal pressure of the particles (kg/cm²·G) | Variations in the internal pressure of the particles | Appearance of the particles | Internal pressure of the particles after standing (kg/cm²·G) |
|---|---|---|---|---|---|
| Example 1 | 0 | 1.0 | No | Good | 0.8 |
| Example 2 | 0 | 0.9 | No | Good | 0.8 |
| Comparative Example 1 | 25 | 0.8 | Yes | Creases and injuries occurred. | 0.5 |
| Comparative Example 2 | 13 | 0.8 | Yes | Creases and injuries occurred. | 0.6 |

The pressurizing time required to obtain a partial internal pressure of 0.9 kg/cm²(G) was also measured, and the results are shown in Table 4.

TABLE 4

|  | Pressurizing time (hours) |
|---|---|
| Example 1 | 13 |
| Example 2 | 12 |
| Comparative Example 1 | 60 |
| Comparative Example 2 | 65 |

TABLE 1

|  | Base resin | Proportion (parts by weight) Resin particles | Water | Dichlorodifluoromethane | Apparent expansion ratio |
|---|---|---|---|---|---|
| Example 1 | Cross-linked polyethylene | 100 | 230 | 28 | 26 |
| Example 2 | Ethylene/propylene random copolymer | 100 | 230 | 18 | 30 |
| Comparative Example 1 | Same as in Example 1 | | | | |
| Comparative Example 2 | Same as in Example 2 | | | | |

The pre-foamed particles were then left to stand at room temperature and atmospheric pressure for 50 hours, placed in a pressurizing vessel, and subjected to pressurizing treatment at room temperature by feeding pressurized air into the vessel. The pressurizing treatment conditions were as shown in Table 2. It is seen from Table 2 that in Examples 1 and 2, a low pressure was applied in the initial stage and then gradually elevated, whereas in Comparative Examples 1 and 2, an elevated pressure was applied from the start and maintained.

The details of the relation between the pressurizing treatment time and the pressure of the gaseous atmosphere in Example 1 and 2 and Comparative Examples 1 and 2 are shown in FIG. 1, and the details of the relation between the pressurizing treatment time and the internal pressure of the particles are shown in FIG. 2. In FIG. 1, a refers to Example 1; b, to Example 2; c, to Comparative Examples 1 and 2; t, represents one hour; and p represents 0.07 kg/cm². In FIG. 2, d refers to Example 1; e, to Example 2; f, to Comparative Example 1; and g, to Comparative Example 2.

What is claimed is:

1. A method for pressurizing pre-foamed particles of a polyolefin resin by maintaining the pre-foamed particles in an atmosphere of a pressurized gas to impart thereto an internal pressure of from 0.2 to 2.5 kg/cm²(G), which comprises subjecting the particles while at room temperature or elevated temperature to an initial pressure of not more than 0.5 kg/cm$^2$(G) by feeding an inorganic gas or a mixture of an inorganic gas and a blowing agent into a vessel, and said initial pressure not causing shrinkage to the particles, and thereafter gradually increasing the applied pressure stepwise or continuously at a rate of not more than 0.2 kg/cm$^2$(g) per hour until the pressure reach 0.7 to 3 kg/cm$^2$(G), said step of increasing the applied pressure not causing shrinkage to the particles.

2. A method for pressurizing pre-foamed particles of a polyolefin resin by maintaining the pre-foamed particles in an atmosphere of a pressurized gas to impart thereto an internal pressure of from 0.5 to 0.9 kg/cm$^2$(G), which comprises subjecting the particles while at room temperature or elevated temperature to an initial pressure of not more than 0.4 kg/cm$^2$(G) by feeding an inorganic gas or a mixture of an inorganic gas and a blowing agent into a vessel, and said initial pressure not causing shrinkage to the particles, and thereafter gradually increasing the applied pressure stepwise or continuously at a rate of from 0.03 to 0.2 kg/cm$^2$(G) per hour, until the pressure reaches 0.9 to 2 kg/cm$^2$(G), said step of increasing the applied pressure not causing shrinkage to the particles.

* * * * *